Aug. 13, 1940.  C. J. HOLSLAG  2,211,424
WELDING SYSTEM
Filed Feb. 26, 1938
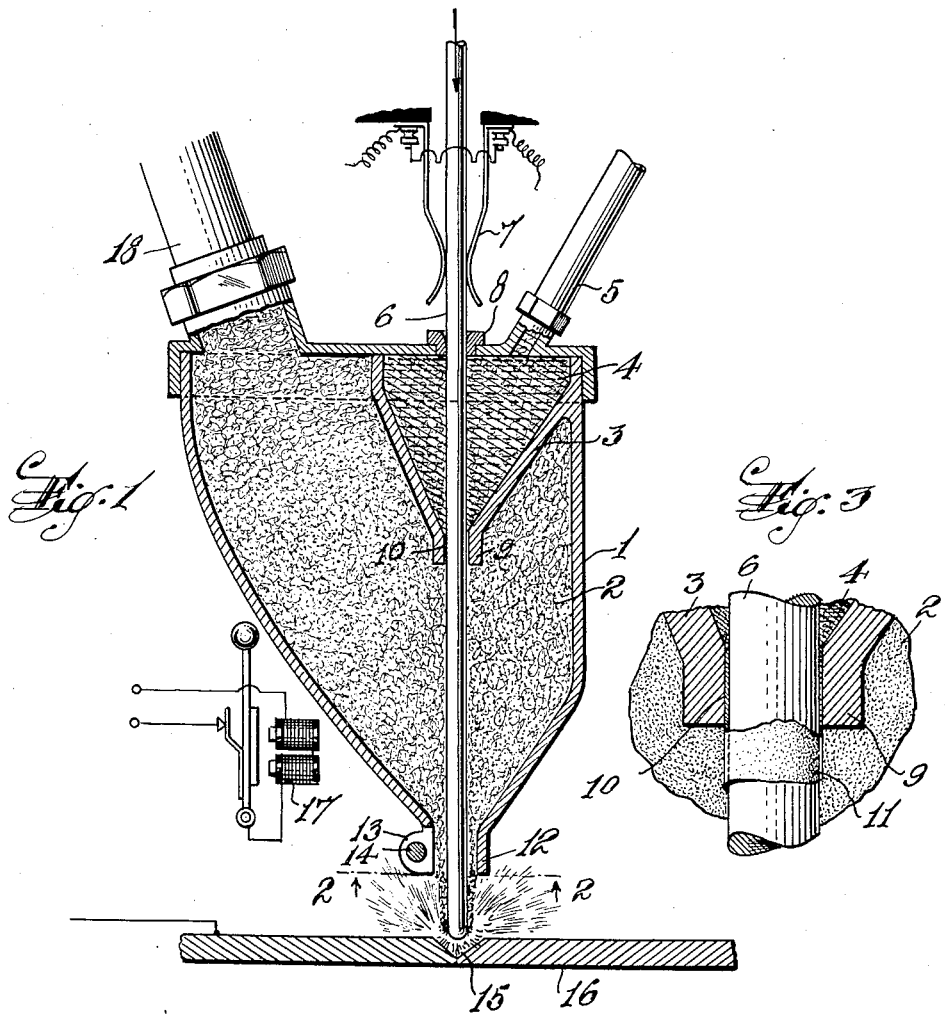
INVENTOR
Claude J. Holslag
BY A. D. T. Libby
ATTORNEY Patented Aug. 13, 1940

2,211,424

UNITED STATES PATENT OFFICE 2,211,424

WELDING SYSTEM

Claude J. Holslag, South Orange, N. J., assignor to Electric Arc Cutting & Welding Company, Newark, N. J.

Application February 26, 1938, Serial No. 192,811

2 Claims. (Cl. 219—8)

This invention relates to an automatic arc welding system, particularly adapted for use in welding thin metal.

One of the objects of my invention is to provide means for passing current into a metallic rod ahead of the application of a coating to the rod, which coating is essential to the welding operation.

It has heretofore been proposed to apply to the welding rod a plastic compound which is compressed into engagement with the movable welding rod, and then depend on the heat of the arc to dry out the water in the covering at a distance from the arcing point of the electrode, as moisture is a very undesirable element in the arc.

It is therefore another object of my invention to provide an automatic welding system in which a relatively thin dry coating is applied to the rod so that the coating may be entirely consumed in the arc, or at least the unconsumed portions will be so light as to float on top of the molten metal and will not become a dross inclusion in the metal, as occurs when a heavy, impacted type of coating is used on the welding rod.

My improved welding system will be readily understood by reference to the annexed drawing, wherein:

Figure 1 is a part-sectional and part-elevational view through a part of the apparatus.

Figure 2 is a view on the line 2—2 of Figure 1.

Figure 3 is a part-sectional and part-elevational view, on an enlarged scale, taken at the nozzle end of the chamber carrying the first coating material.

In the drawing, 1 is a chamber adapted to contain a covering material 2 of any suitable kind, depending on the nature of the welding work to be done. Positioned in the upper part of the chamber 1 is a second chamber 3 adapted to contain a sticky substance 4, the same being fed to the chamber 3 in any satisfactory manner as by a feed pipe 5. Various kinds of sticky substances may be used, one such, for the purpose of illustration but not of limitation, being sodium silicate. The welding rod 6, through which electrical contact is made by brushes 7 before the rod enters the chambers 3 and 1, passes through a stuffing gland 8 into the chamber 3 where it picks up a relatively thin coating of the sticky material. The lower end of the chamber 3 terminates in a nozzle 9 having an opening therein, leaving a slight clearance 10 around the rod so that as the rod passes through the nozzle 9, a very thin coating 11 of the sticky material is applied to the rod.

As the rod passes out of the chamber 3 into the chamber 1, the coating material 2, which is preferably dry and fluffy, adheres to the stick coating 11, and due to the location of the chamber 3 in the upper part of the chamber 1, and the passage of the welding current through the rod 6, the sticky material has a chance to dry before the electrode emerges from the nozzle 12 in the lower end of the chamber 1. The opening in the nozzle 12 is preferably made adjustable by splitting the metal at 13 and using a draw-bolt 14 to regulate the opening around the welding rod 6. Thus the thickness of the covering may be very easily regulated so that only the right amount of covering material 2 will stick to the coating 11 and be carried downwardly toward the arc 15 on the work 16. It is to be understood that if there is any small amount of moisture remaining in the sticky coating by the time it reaches the exit nozzle 12, the heat of the arc will complete the drying operation.

If desired, an agitator 17 may be used to apply a continuous jar to the chamber 1 to keep the coating material 2 in a loose condition as it is fed to the chamber 1 in any satisfactory manner as by a feed pipe 18.

I have found that a dry covering material applied to the welding electrode in the manner described has many advantages over a heavy, impacted coating such as heretofore used in automatic arc welding systems.

What I claim is:

1. In an arc welding system utilizing a pair of electrodes, one of which is the work to be welded while the other is a movable metallic rod with means for feeding said rod toward the work; means for coating the rod with a material to aid in welding and which will leave no dross in the weld, said means including a pair of chambers arranged with their exits in spaced vertical alignment for passage of the rod therethrough, the chamber having the upper exit containing a sticky substance and having an exit opening which leaves only a slight clearance around the rod to insure that only a very thin coating of the sticky material will be applied to the rod, the chamber having the lower exit containing a dry material which will adhere to the sticky material on the rod, and means for passing the welding current through at least that portion of the rod which is going through the chambers to dry the sticky material while the material in the second chamber is in contact with it.

2. In an arc welding system utilizing a pair of electrodes, one of which is the work to be welded while the other is a movable metallic rod with means for feeding said rod toward the work; means for coating the rod with a material to aid in welding and which will leave no dross in the weld, said means including a pair of chambers arranged so as to feed their contents downward by gravity, the chambers being further arranged one within the other and so the welding rod can be moved downwardly through them to the workpiece, the exits of the chambers being separated a considerable distance one from the other, the upper chamber containing a sticky substance and having an exit opening but slightly greater than the rod for the purpose described, the lower chamber having an adjustable exit opening and containing a dry, fluffy material which will adhere to the sticky material on the rod, and means for passing current through at least that portion of the rod which is going through the chambers to substantially dry the sticky coating before the arc is reached.

CLAUDE J. HOLSLAG.